United States Patent [19]

Maehara

[11] Patent Number: 5,530,554
[45] Date of Patent: Jun. 25, 1996

[54] IMAGE FORMING SYSTEM WITH COMMON PROCESSOR BUS ARCHITECTURE

[75] Inventor: Hidejirou Maehara, Yokohama, Japan

[73] Assignee: Ricoh Co., Ltd., Tokyo, Japan

[21] Appl. No.: 48,795

[22] Filed: Apr. 16, 1993

[30] Foreign Application Priority Data

Apr. 23, 1992 [JP] Japan ..................... 4-104860

[51] Int. Cl.[6] .............. H04N 1/00; H04N 1/32; G06F 15/00
[52] U.S. Cl. .............. 358/296; 358/442; 395/114
[58] Field of Search ................... 358/296, 401, 358/407, 434, 441, 442, 444, 468; 395/114; 355/202; 379/63, 88, 93, 100

[56] References Cited

U.S. PATENT DOCUMENTS

| | | | |
|---|---|---|---|
| 4,642,697 | 2/1987 | Wada | 379/100 |
| 4,694,352 | 9/1987 | Ina et al. | 379/100 |
| 4,722,064 | 1/1988 | Suzuki | 394/114 |
| 4,947,345 | 8/1990 | Paradise et al. | 358/442 X |
| 5,130,805 | 7/1992 | Rikima | 358/296 |
| 5,148,293 | 9/1992 | Miyachi | 358/444 |
| 5,200,993 | 4/1993 | Wheeler et al. | 358/442 X |
| 5,323,246 | 6/1994 | Kotani et al. | 358/434 |

*Primary Examiner*—Peter S. Wong
*Assistant Examiner*—Eric Frahm
*Attorney, Agent, or Firm*—Cooper & Dunham

[57] ABSTRACT

An image forming apparatus which can perform a number of jobs usually performed by a host computer. The image forming apparatus has a printer and a scanner, and is used with a host computer having a standard bus line provided with an external connection. The image forming apparatus includes a bus line having at least the same architecture as that of the standard bus line used in the host computer, an interface, connected to the bus line, provided for connecting the host computer to the bus line, a central processing unit, connected to a bus controlling unit, provided for controlling a data flow of image data, a basic input/output system provided for controlling an input/output of the image data to/from optional apparatuses connected to the image forming apparatus, and a bus controlling unit, connected to the bus line, the central processing unit and the basic input/output system, provided for controlling data communication between the bus line and each of the central processing unit and the basic input/output system.

11 Claims, 7 Drawing Sheets

IMAGE FORMING SYSTEM WITH COMMON PROCESSOR BUS ARCHITECTURE

BACKGROUND OF THE INVENTION

The present invention generally relates to an image forming apparatus, and more particularly to an image forming apparatus having a scanning function and a printing function, which apparatus can be used with a host computer.

Some conventional image forming apparatuses having both a scanning function and a printing function, such as a laser printer equipped with a scanner, a digital copy machine or a facsimile machine, are equipped with an interface by which the image forming apparatus can be connected to a host computer. The image forming apparatus is connected to the host computer via an interface such as an RS232C interface.

Under such a connected condition, a printer and a scanner in the image forming apparatus are independently controlled by the host computer. Namely, the printing function and the scanning function of the image forming apparatus are controlled by a command signal sent from the host computer. Additionally, the host computer may send image data to be printed out by the printer of the image forming apparatus as well as sending a command signal. Image data may be transferred from an optional apparatus, such as a hard disk apparatus or a floppy disk apparatus connected to the image forming apparatus in accordance with a command from the host computer.

However, since the host computer has many jobs other than controlling the image forming apparatus, when the host computer is performing other jobs, an operation speed of the image forming apparatus may become slow. Additionally, an executing speed of the host computer for jobs other than controlling of the image forming apparatus may also become slow.

SUMMARY OF THE INVENTION

It is a general object of the present invention to provide an improved and useful image forming apparatus which can eliminate the above-mentioned disadvantages.

A more specific object of the present invention is to provide an image forming apparatus which can perform a number of jobs usually performed by a host computer.

In order to achieve the above-mentioned objects, an image forming apparatus having a printer for printing a picture in accordance with image data supplied by a print controlling unit and scanner for scanning an original and for supplying image data to a scanner controlling unit, the image forming apparatus being used with a host computer having a standard bus line provided with an external connection and optional apparatuses which are related with image data processing and connected to said image forming apparatus, comprises:

a bus line having at least the same architecture as that of the standard bus line used in the host computer, the bus line being connected to the optional apparatuses via a buffer which controls a data flow of image data to/from the optional apparatuses, the bus line being connected to a data port via which the bus line is connected to the print controlling unit and the scanner controlling unit;

an interface, connected to the bus line, provided for connecting the host computer to the bus line;

a central processing unit, connected to a bus controlling unit, provided for controlling a data flow of image data between each of the optional apparatuses and the print controlling unit or the scanner controlling unit, a data flow of image data between said host computer and the print controlling unit or the scanner controlling unit, and a data flow of image data between the host computer and each of the optional apparatuses;

a basic input/output system provided for controlling an input/output of the image data to/from the optional apparatuses; and a bus controlling unit, connected to the bus line, the central processing unit and the basic input/output system, provided for controlling data communication between the bus line and each of the central processing unit and the basic input/output system.

According to the present invention, due to the provision of the bus line which can be connected to the host computer and the central processing unit, a number of control jobs formerly performed by the host computer can be transferred to the image forming apparatus; thus the executing speed of jobs performed by either the image forming apparatus or the host computer can be increased because different jobs can be simultaneously performed by the host computer and the image forming apparatus.

Other objects, features and advantages of the present invention will become more apparent from the following detailed description when read in conjunction with the accompanying drawings.

DETAILED DESCRIPTION OF THE PREFERRED EMBODIMENT

A description will now be given of an embodiment of the present invention.

Figure 1:
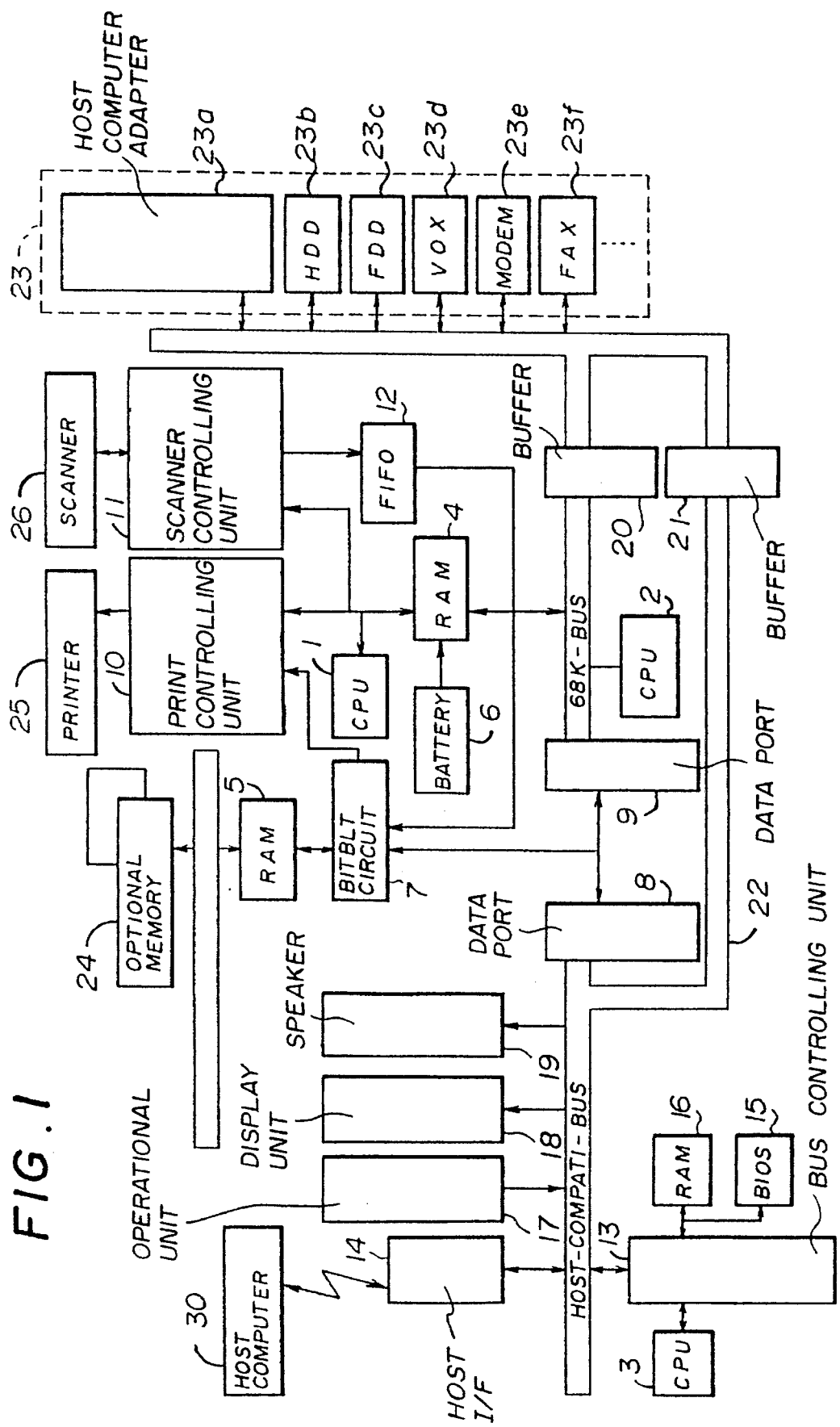
FIG. 1 is a block diagram of an image forming apparatus according to the present invention.

FIG. 1 is a block diagram of an image forming apparatus according to the present invention. This embodiment comprises central processing units (CPU) 1, 2 and 3, random access memories (RAM) 4 and 5, a battery 6, a bit aligned block transfer (BITBLT) circuit 7, data ports 8 and 9, a print controlling unit 10, a scanner controlling unit 11, a first in first out (FIFO) memory 12, a bus controlling unit 13, a host interface (I/F) 14, a basic input/output system (BIOS) 15, a RAM 16, an operational unit 17, a display unit 18, a speaker 19, buffers 20 and 21, and a host compatible bus 22. A notation 23 indicates optional apparatus which may be connected to the image processing apparatus. A print engine 25 and a scanner 26 are respectively connected to the print controlling unit 10 and the scanner controlling unit 11.

The image forming apparatus of the present embodiment is connected to a host computer 30 via the host I/F 14. The host computer 30 has a standard bus line, for example in IBM PC compatible bus, and the bus line has a connection by which an external apparatus can be connected to the bus line.

A description will be now given of functions of each part of the present embodiment shown in FIG. 1.

The CPU 1 controls a printer and a scanner via the print controlling unit 10 and the scanner controlling unit 11. In this embodiment, a chip 68HC11 is used as the CPU 1.

The CPU 2 processes image data supplied to the printer and image data supplied by the scanner. In this embodiment, a chip 68000 is used as the CPU 2.

The CPU 3 performs a systematic control for the host I/F 14, the operational unit 17, display unit 18 and the speaker 19. In this embodiment, a chip 80286 is used as the CPU 3.

The RAM 4, which is a dual port memory having a capacity of 32 KB, stores a program for controlling the CPU 1 and performs communication with The CPU 2.

The RAM 5 comprises a static RAM having a capacity of 4 MB, and is used for storing a control program of the RAM 4 and image data. The battery 6 backs up the RAM 5 in case of an unintentional power cut-off.

The BITBLT circuit 7, functions as a peripheral chip of the CPU 2, performs a preparation of image data, supplies the image data to the print controlling unit 10, reads out image data supplied by the scanner, and refreshes the RAM 5.

The data port 8 is provided for performing a communication between the CPU 3 and the BITBLT circuit 7 and the CPU 3 and the data port 9. The data port 9 is provided for a communication between the RAM 4 and the BITBLT circuit 7 and the RAM 4 and the data port 8.

The print controlling unit 10, mainly controlled by the CPU 1, performs an output control for the printer 25, for example, a laser printer. The scanner controlling unit 11, mainly controlled by the CPU 1, performs a control operation for the scanner 26 and sends image data which is obtained by the scanner to the FIFO memory 12.

The FIFO memory 12 temporarily stores image data supplied by the scanner controlling unit 11 and outputs the image data to the RAM 5 in the order the data was stored.

The bus controlling unit 13 mainly controls the basic input/output system 15, the RAM 16 and the CPU 3 so as to perform the same bus control as is performed in the host computer 30.

The host I/F 14, which is an interface provided for performing a communication between the image performing apparatus and the host computer 30, normally comprises a bicentro interface or a small computer system interface (SCSI I/F). In this embodiment, the bicentro I/F is used as the host I/F 14.

The basic input/output system 15 controls optional apparatuses 23 connected to the image forming apparatus.

The RAM 16, having a capacity of 1 Mb, is a memory used by the CPU 3.

The operational unit 17, which includes an input key panel is used by an operator to input various information and instructions. The display unit 18, which includes a liquid crystal display (LCD), displays the input information. The speaker 19 notifies an operator of an error occurrence by means of a sound.

The buffers 20 and 21 are provided for controlling data flow between bus lines and the optional apparatuses 23 such as a host computer adapter 23a used for establishing a local area network, a hard disk apparatus (HDD) 23b, a floppy disk apparatus (FDD) 23c, a voice mail box (VOX) 23d, a modem 23e, or a facsimile apparatus (FAX) 23f.

The host compatible bus 22 has the same functions as a bus line employed in the host computer 30 which is provided with a connection to a bus line of an external apparatus. The bus controlling unit 13, the host I/F 14, the operational unit 17, the display unit 18, the speaker 19, the data port 8 and the buffer 21 are respectively connected via the host compatible bus 22.

The optional memory 24 is a memory which may be additionally connected to the image forming apparatus.

It should be noted that since the CPU 3 is connected to the bus controlling unit 13 and also connected to the RAM 16, the BIOS 15 and the host compatible bus 22, the CPU 3 can function as an independent computer similar to a so called personal computer.

A description will be now given of an operation of the image forming apparatus mentioned above.

When the image forming apparatus is turned on, a booting operation of the CPU 3 starts to download a system program for the CPU 1 and the CPU 2. The system program is downloaded from the host computer 30 via the host I/F 14 and the host compatible bus 22. The system program may be downloaded from the HDD or the FDD which is connected as an optional apparatus. The system program is firstly supplied and stored in the RAM 5 via the BITBLT circuit 7.

Then the CPU 2 downloads a program for the CPU 1 from the RAM 5 to the RAM 4, and performs an initialization of the data ports 8 and 9.

Figure 2:
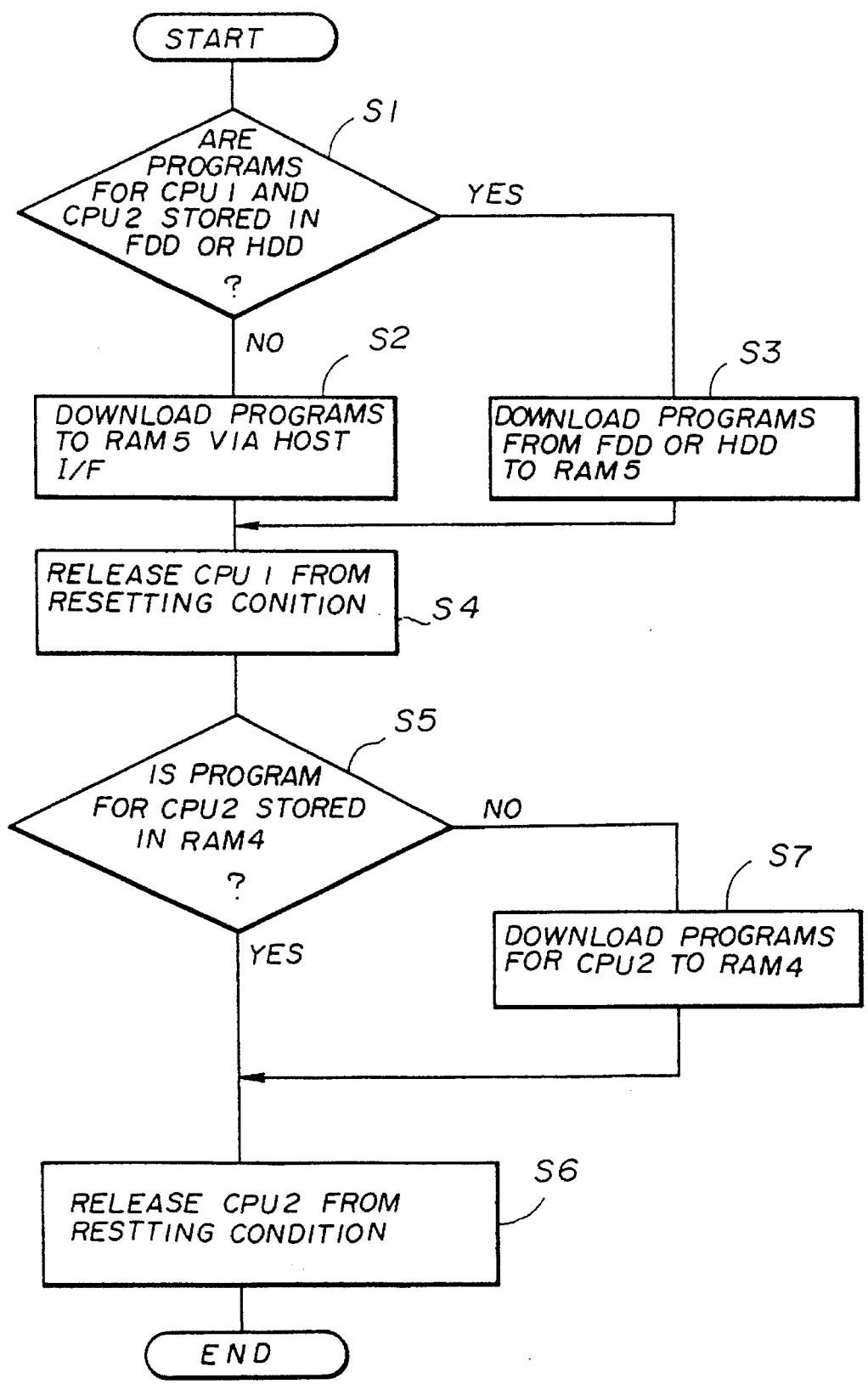
FIG. 2 is a flowchart of an initial operation performed in the image forming apparatus shown in FIG. 1.

FIG. 2 is a flowchart of a routine of the initial operation performed in the image forming apparatus according to the present invention.

When the image forming apparatus is turned on and the routine of the initial operation starts, it is judged, in step S1 (hereinafter "step" will be omitted), whether or not programs for used by the CPU1 and the CPU 2 are stored in the FDD 232c or the HDD 23b. When it is judged, in S1, that programs are stored in the FDD 23c or the HDD 23b, the routine proceeds to S3 where the programs are downloaded to the RAM 5 via the buffer 21, the host compatible bus 22, the data port 8, and the BITBLT circuit 7. Then the routine proceeds to S4.

On the other hand, when it is judged, in S1, that programs are not stored in the FDD 23c or the HDD 23b, the routine proceeds to S2 where the programs are downloaded to the RAM 5 via the host I/F 14, the host compatible bus 22, the data port 8, and the BITBLT circuit 7. Then the routine proceeds to S4.

In S4, the CPU 1 is released from a resetting condition, and thus the CPU 1 turns in a operating condition. After the execution of S4, the routine proceeds to S5 where it is judged whether or not a program used by the CPU2 is stored in the RAM 4. The program for the RAM 4 is contained in the program for the CPU 1.

When it is judged that the program for the CPU 2 is not stored in the RAM 4, the routine proceeds to S7 where the program for the CPU 2 is downloaded to the RAM 4. By the execution of S7, the program for the CPU 2 is store in the RAM 4 which is bucked up by means of the battery 6. Accordingly, the program for the CPU 2 remains in the RAM 4 for a next operation even after the image forming apparatus is turned off. After the execution of S7, the routine proceeds to S6.

When it is judged, in S54, that the program for the CPU 2 is stored in the RAM 4, the routine proceeds to S6 where the CPU 2 is released from a resetting condition to allow the CPU 2 to be in an operating condition, and the routine for the initial operation ends.

After the completion of the above-mentioned initial operation, an operation of the image forming apparatus is performed without any instructions from the host computer 30 since the program for the operation is downloaded in the image forming apparatus.

A description will now be given, with reference to FIGS. 3 to 7, of some data flows in the image forming apparatus.
(1) printer mode (refer to FIG. 3)

Figure 3:
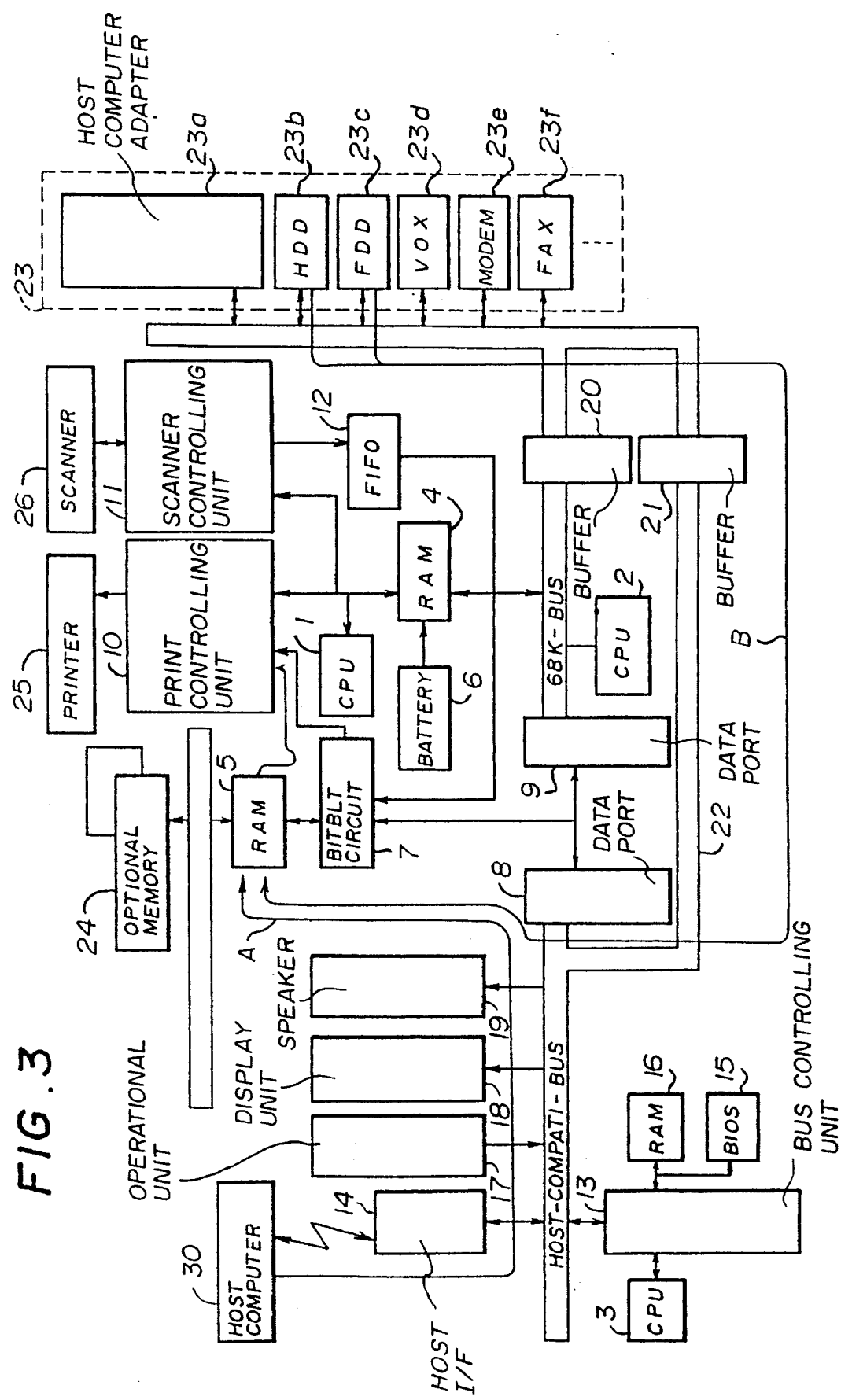
FIG. 3 is a block diagram of the image forming apparatus shown in FIG. 1 for explaining data flows in a printer mode.

When data which is to be printed is supplied by the host computer 30, as shown by an arrow A in FIG. 3, the CPU 3 transfers the data to the RAM 5 via the I/F14, the host compatible bus 22, the data port 8 and the BITBLT circuit 7. Then the data is converted into a bit-map by the BITBLT circuit 7 in accordance with an instruction by the CPU 2, and the bit-map is transferred to the print controlling unit 10 as a video signal. The printer 25 prints out a picture in accordance with the video signal.

When data supplied by the HDD or the FDD is printed out, as shown by an arrow B in FIG. 3, the CPU 3 transfers the data to the RAM 5 via the buffer 21, the host compatible bus 22, data port 8 and the BITBLT circuit 7. After that, the CPU 2 performs the same operation as described in the above.
(2) scanner mode (refer to FIG. 4)

Figure 4:
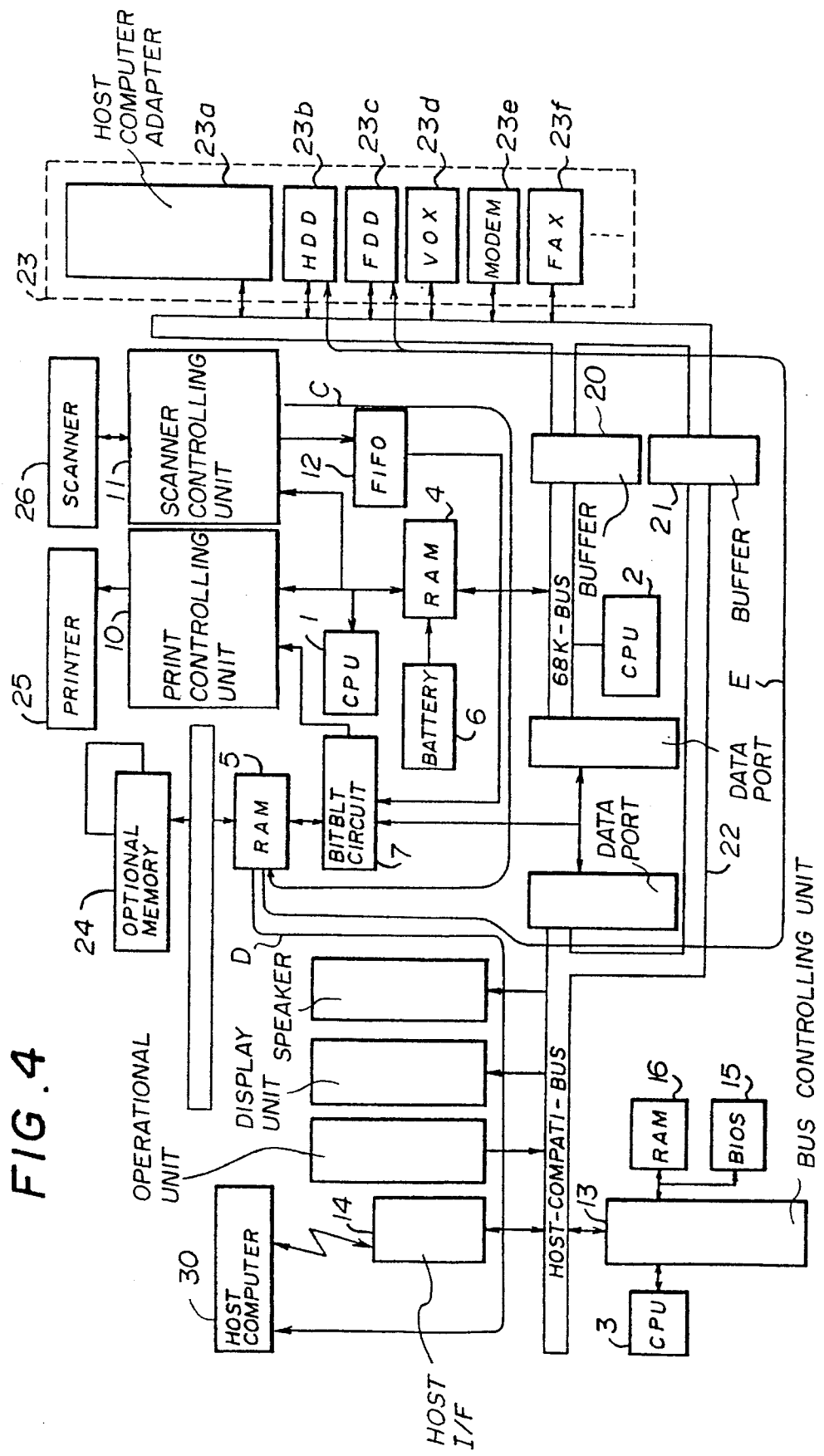
FIG. 4 is a block diagram of the image forming apparatus shown in FIG. 1 for explaining data flows in a scanner mode.

Image data of an original obtained by scanning performed by the scanner 26 is, as shown by an arrow C in FIG. 4, transferred to the RAM 5 via the scanner controlling unit 11, the FIFO memory 12 and the BITBLT circuit 7. After that, as shown by an arrow D in FIG. 3, the CPU 3 may transfer the image data to the host computer 30 via the BITBLT circuit 7, the data port 8, the host compatible bus 22 and the host I/F 14, or the CPU 3 may transfer the image data to the HDD 23b or the FDD 23c via the BITBLT circuit 7, the data port 8, the host compatible bus 22 and the buffer 21 as shown by an arrow E shown in FIG. 4.
(3) copy mode (refer to FIG. 5)

When a start command for a copy operation is input from the operational unit 17, The CPU 3 sends a copy command to the CPU 2. In accordance with the copy command, the CPU 2 sends a command for starting a scanning operation to the CPU 1. Upon reception of the command, the CPU 1 causes the scanner controlling unit 11 to start a scanning operation of an original provided to the scanner 26.

Then the CPU 2 causes the BITBLT circuit 7 to start to receive image data by a direct memory access (DMA) transfer. The image data is then transferred, as shown by an arrow C in FIG. 5, to the RAM 5 via the scanner controlling unit 11, FIFO memory 12 and the BITBLT circuit 7.

After the completion of the read out operation for the image data, The CPU 2 sends to the CPU a command for starting a printing operation. After that, the image data is transferred to the print controlling unit 10 to print out a picture by means of the printer 25.
(4) facsimile transmission mode (refer to FIG. 6)

Figure 5:
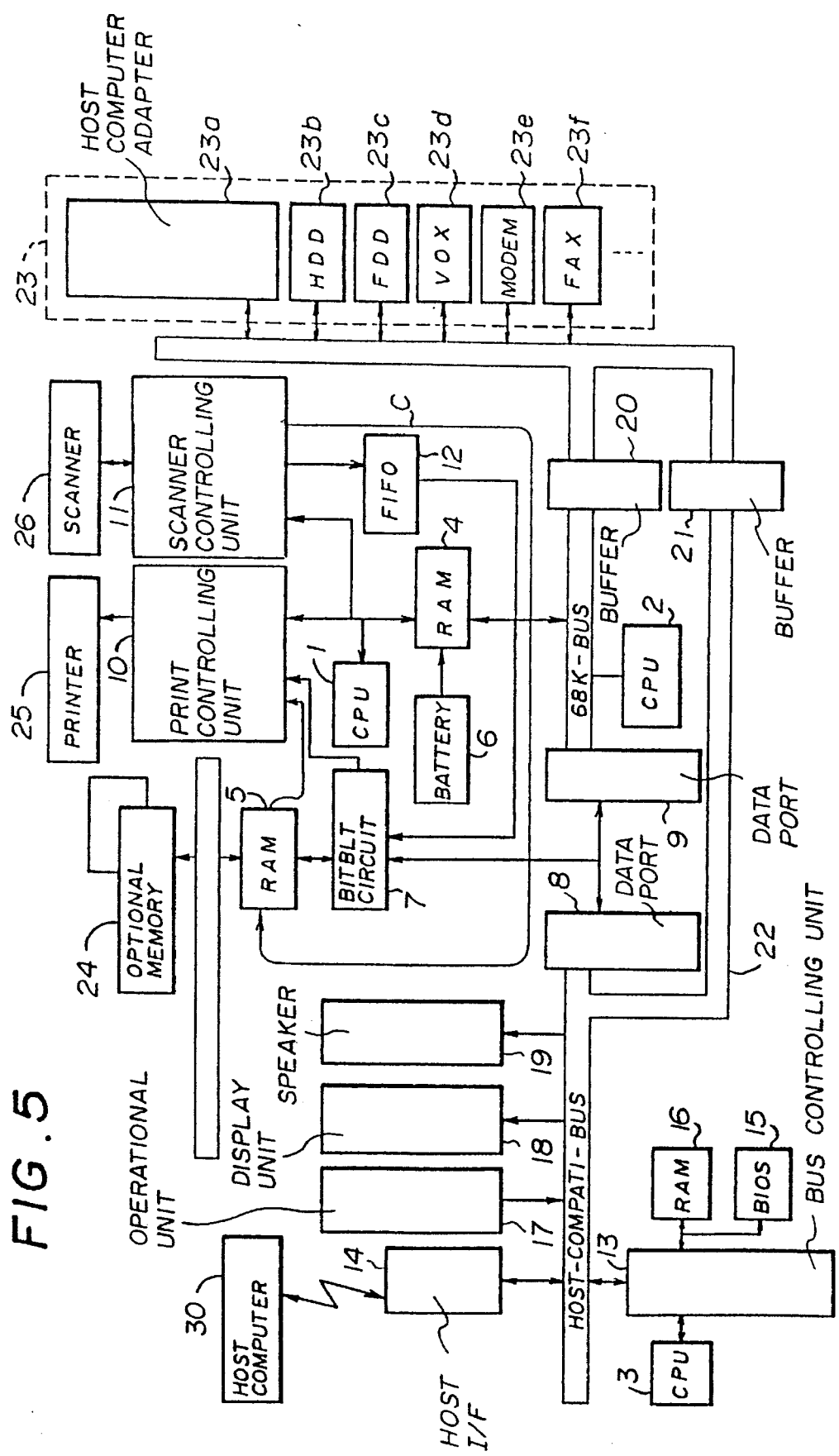
FIG. 5 is a block diagram of the image forming apparatus shown in FIG. 1 for explaining data flows in a copy mode.
Figure 6:
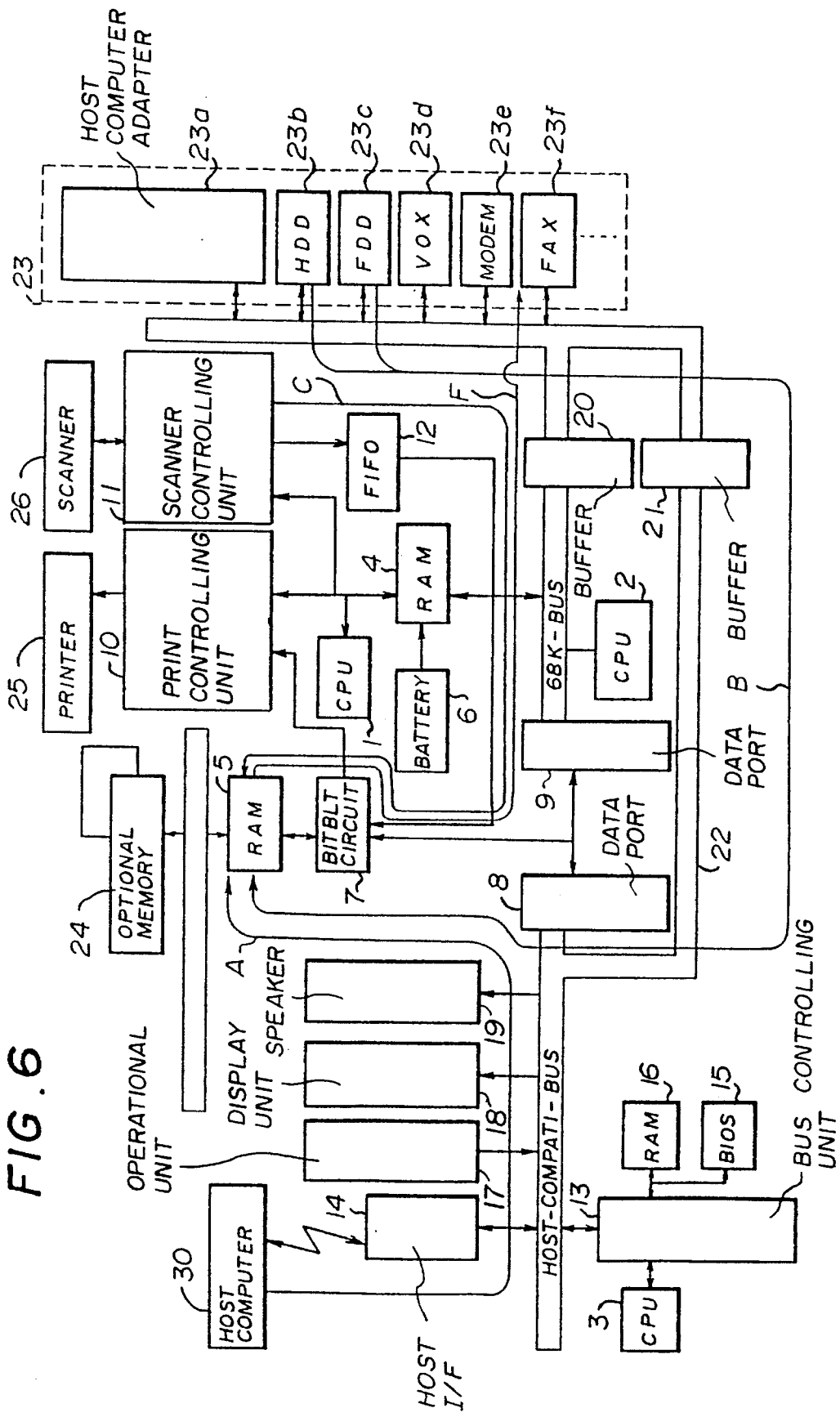
FIG. 6 is a block diagram of the image forming apparatus shown in FIG. 1 for explaining data flows in a facsimile transmission mode.

When data, which is to be transmitted by a facsimile machine connected to the image forming apparatus as one of the optional apparatuses 23, is supplied by the host computer 30, the CPU 3 transfers the data to the RAM 5, as shown by an arrow A in FIG. 5, via the host I/F 14, the host compatible bus 22 data port 8 and the BITBLT circuit 7. Then the data is converted into a bit-map by the BITBLT circuit 7 in accordance with an instruction by the CPU 2, and the bit-map is transferred, as shown by an arrow F in FIG. 6, to the facsimile machine via the data port 9 and the buffer 20.

When data which is to be transmitted by means of a facsimile transmission supplied by the HDD or the FDD connected to the image forming apparatus as one of the optional apparatuses, the CPU 3 transfers the data to the RAM 5, as shown by an arrow B in FIG..5, via the buffer 21, the host compatible bus 22, the data port 8 and the BITBLT circuit 7. After that, the CPU 2 performs the same operation as that described in the above.

When data which is to be transmitted by means of a facsimile transmission supplied by the scanner 26, the data is transferred, as shown by an arrow C in FIG..6, to the RAM 5 and then the CPU performs the same operation as described in the above.
(5) facsimile data reception mode (refer to FIG. 7)

Figure 7:
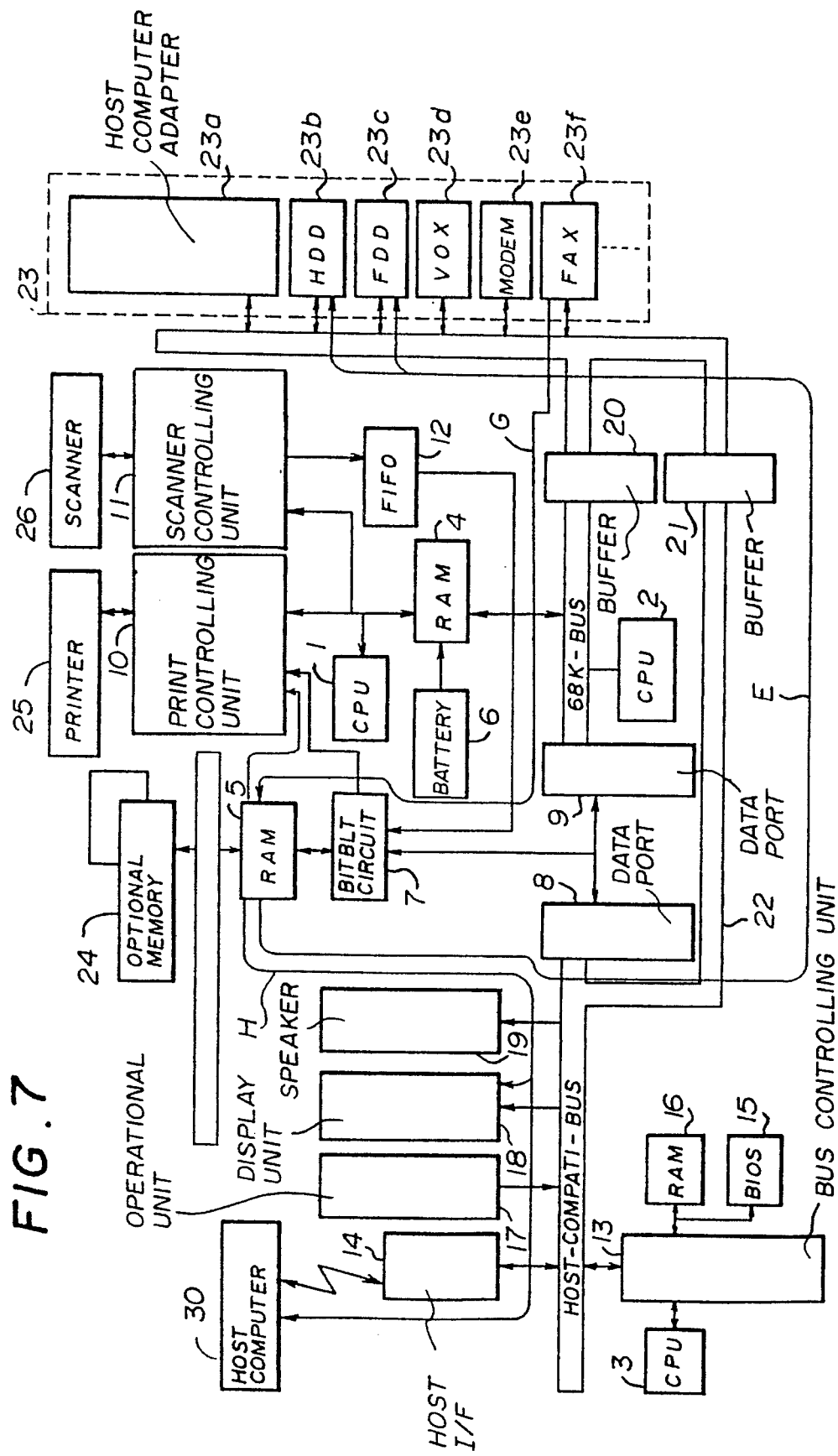
FIG. 7 is a block diagram of the image forming apparatus shown in FIG. 1 for explaining data flows in a facsimile data reception mode.

When data is supplied to the image forming apparatus by the facsimile machine connected to the image forming apparatus as one of the optional apparatuses, the data is transferred to the RAM 5, as shown by an arrow G in FIG. 7, via the buffer 20, the data port 9 and the BITBLT circuit 7. In order to print out the data supplied by the facsimile machine, the data is transferred to the print controlling unit 10 similarly to the operation in the printer mode, and then the printer prints out a picture in accordance with the data.

When the data stored in the RAM 5 is displayed, the CPU 3 transfers the data to the display unit 18, as shown by an arrow H in FIG. 7, via the BITBLT circuit 7, the data port 8 and the host compatible bus 22.

When the data stored in the RAM 5 is sent to the host computer 30, the CPU 3 transfers the data to the host computer 30, as shown by an arrow H in FIG. 7, via the BITBLT circuit 7, the data port 8, the host compatible bus 22 and the host I/F 14.

When the data transferred to the RAM 5 is stored, the CPU 3 transfers the data to the HDD or the FDD, as shown by an arrow E in FIG. 7, via the BITBLT circuit 7, the data port 8, the host compatible bus 22 and the buffer 21.

As described in the above, according to the present embodiment, due to the provision of the host compatible bus 22 which can be connected to the host computer 30, the image forming apparatus can perform some of job which conventionally is performed by the host computer 30; thus the executing speed of jobs can be increased by simultaneously performing different jobs by means of the host computer and the image forming apparatus.

Additionally, since the CPU 1 and the CPU 3, and the CPU 2 and the CPU 3 can commonly use the same memory, provision of a communication interface is not needed between each CPU, and the memory cost is reduced.

Further, since the bus line 22 can be directly accessed by a plurality of CPUs, data supplied by the optional apparatuses connected to the bus line 22 can be directly accessed by one CPU without routing through other CPUs; thus the data transferring speed is increased.

Furthermore, since the control programs for the CPUs provided in the image forming apparatus can be downloaded to the CPUs from the host computer 30 via the host I/F 14, the control program used by the image forming apparatus can be freely changed without replacing a read only memory (ROM) which is necessary in the conventional system; thus the response to various applications or change in specifications can be simply performed. In this case, by supplying electric power by means of the battery 6 to the RAM 4 in which the downloaded control programs are stored, the control programs can be kept in the RAM 4 after the power of the image forming apparatus is turned off either intentionally or unintentionally. Thus the same program can be run in the next operation without the download operation having been performed previously.

The present invention is not limited to the specifically disclosed embodiments, and variations and modifications may be made without departing from the scope of the present invention.

What is claimed is:

1. An image forming apparatus having printing means for printing a picture in accordance with image data supplied by a print controlling unit and scanning means for scanning an original and for supplying image data to a scanner controlling unit, said image forming apparatus being used with a host computer having a standard bus line provided with an external connection, said image forming apparatus performing image data communication with optional apparatuses, the image forming apparatus comprising:

a bus line being connected to said optional apparatuses via a buffer which controls a data flow of image data to/from said optional apparatuses, said bus line being connected to a data port via which said bus line is connected to said print controlling unit and said scanner controlling unit;

an interface, connected to said bus line, provided for connecting said host computer to said bus line;

a central processing unit provided for controlling a data flow of image data between one of said optional apparatuses and said print controlling unit or said scanner controlling unit, a data flow of image data between said host computer and said print controlling unit or said scanner controlling unit, and a data flow of image data between said host computer and one of said optional apparatuses;

a basic input/output system provided for controlling an input/output operation of said image data to/from said optional apparatuses; and a bus controlling unit, connected to said bus line, said central processing unit, and said basic input/output system, provided for controlling data communication between said bus line and each of said central processing unit and said basic input/output system, wherein said bus line is controlled, in the same manner as a bus control performed in said host computer, by said central processing unit and said bus controlling unit.

2. The image forming apparatus as claimed in claim 1, further comprising inputting means for inputting information corresponding to an instruction to said central processing unit so that an operator can control said image forming apparatus to perform a desired predetermined operation.

3. The image forming apparatus as claimed in claim 2, wherein said inputting means comprises a key pad.

4. The image forming apparatus as claimed in claim 2, further comprising display means for displaying said information input via said inputting means.

5. The image forming apparatus as claimed in claim 1, further comprising notifying means for notifying an operator of an error occurrence in said image forming apparatus.

6. The image forming apparatus as claimed in claim 5, wherein said notifying means comprises a speaker of making a sound when an error has occurred in said image forming apparatus.

7. The image forming apparatus as claimed in claim 1, further comprising a plurality of central processing units and a memory to which at least two of said central processing units can access directly.

8. The image forming apparatus as claimed in claim 7, further comprising downloading means for downloading control programs for at least one of said central processing units from said host computer or one of said optional apparatuses via said bus line.

9. The image forming apparatus as claimed in claim 8, further comprising memory means for storing downloaded programs.

10. The image forming apparatus as claimed in claim 9, further comprising a battery which supplies an electricity to said memory means so that said control programs stored in said memory means remain stored therein when an electric power supplied to said image forming apparatus is turned off.

11. The image forming apparatus as claimed in claim 10, wherein said memory means comprises a static random access memory.

* * * * *